(12) United States Patent
Tirpak et al.

(10) Patent No.: US 9,866,889 B2
(45) Date of Patent: Jan. 9, 2018

(54) ASYMMETRIC CONTENT DELIVERY OF MEDIA CONTENT

(71) Applicant: ECHOSTAR TECHNOLOGIES L.L.C., Englewood, CO (US)

(72) Inventors: Christopher Tirpak, Englewood, CO (US); David A. Kummer, Highlands Ranch, CO (US)

(73) Assignee: ECHOSTAR TECHNOLOGIES llc, Englewood, CO (US)

(*) Notice: Subject to any disclaimer, the term of this patent is extended or adjusted under 35 U.S.C. 154(b) by 0 days.

(21) Appl. No.: 14/137,168

(22) Filed: Dec. 20, 2013

(65) Prior Publication Data

US 2014/0282767 A1 Sep. 18, 2014

Related U.S. Application Data

(60) Provisional application No. 61/791,044, filed on Mar. 15, 2013.

(51) Int. Cl.
*H04N 21/414* (2011.01)
*H04N 21/4367* (2011.01)
*H04N 21/63* (2011.01)

(52) U.S. Cl.
CPC ..... *H04N 21/414* (2013.01); *H04N 21/41407* (2013.01); *H04N 21/4367* (2013.01); *H04N 21/631* (2013.01)

(58) Field of Classification Search
CPC ............. H04N 21/441; H04N 21/4405; H04N 21/43615; H04N 21/654; H04N 21/2347; H04N 21/25875; H04N 21/4402; H04N 21/23406; H04N 21/25891; H04N 21/4331; H04N 21/4383; H04N 21/47217;
(Continued)

(56) References Cited

U.S. PATENT DOCUMENTS 6,263,503 B1 7/2001 Margulis
7,707,614 B2 4/2010 Krikorian et al.
(Continued)

FOREIGN PATENT DOCUMENTS

EP 1429512 A1 6/2004
EP 1566939 A1 8/2005
(Continued)

OTHER PUBLICATIONS

USPTO Office Action, U.S. Appl. No. 13/837,108, dated Mar. 20, 2015.
(Continued)

*Primary Examiner* — Benjamin R Bruckart
*Assistant Examiner* — Aklil Tesfaye
(74) *Attorney, Agent, or Firm* — Lorenz & Kopf LLP

(57) ABSTRACT

Systems, devices and methods are provided to support efficient and secure delivery of a media stream or content file to a mobile phone, tablet, computer or other remote device. Most of the media stream's content is received directly from a content source for efficient bandwidth allocation, but at least a portion of the stream is delivered from a set top box, television receiver, or other home device that is located at the customer's premises to preserve the security of the stream. The portion that is delivered from the home device may be a key portion of the stream that is essential to the playback of media stream.

20 Claims, 2 Drawing Sheets

Figure 1:
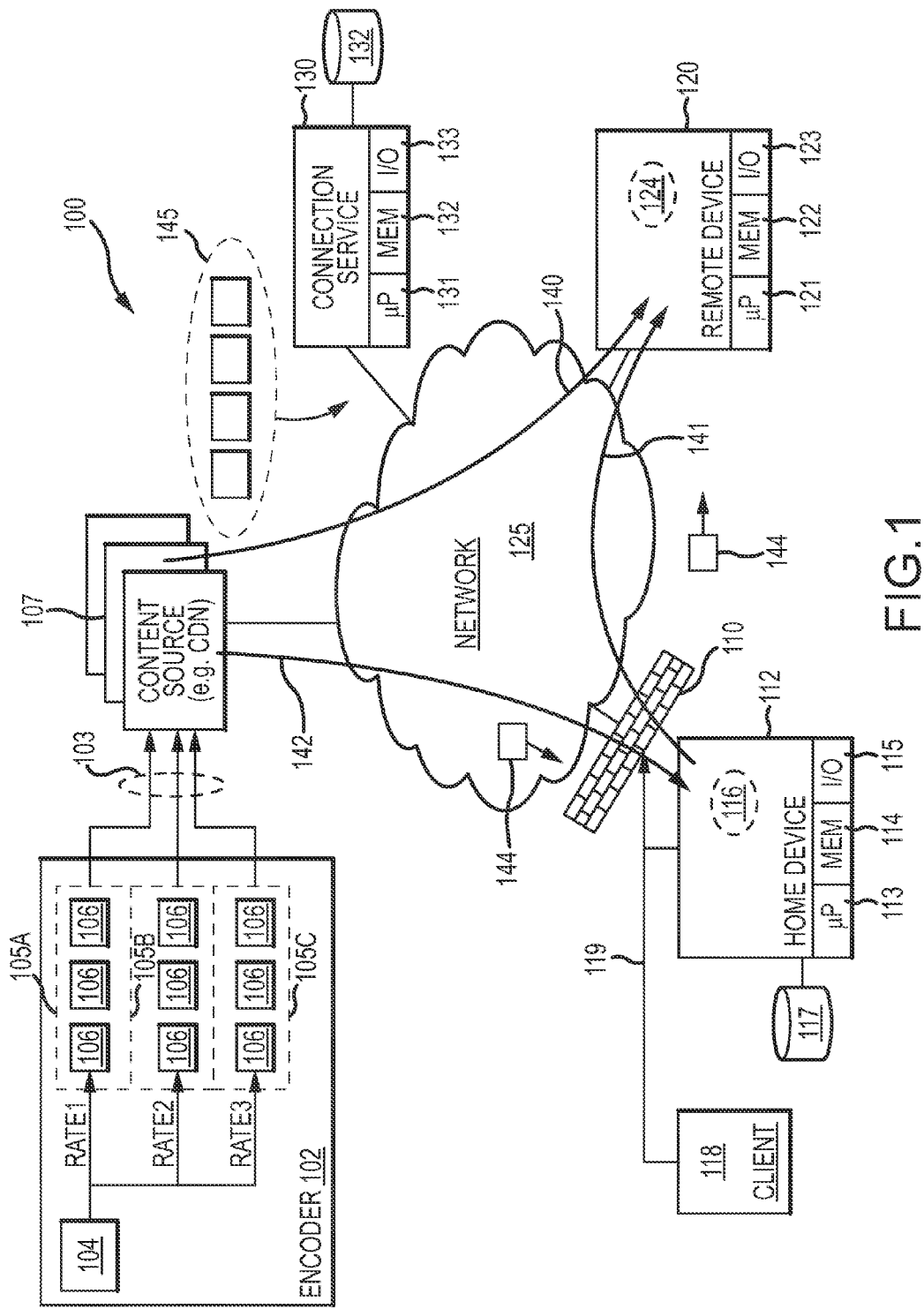

(58) Field of Classification Search
CPC ............. H04N 21/414; H04N 21/4367; H04N 21/631; H04N 21/41407
See application file for complete search history.

(56) References Cited

U.S. PATENT DOCUMENTS

| | | | |
|---|---|---|---|
| 7,818,444 | B2 | 10/2010 | Brueck et al. |
| 7,877,776 | B2 | 1/2011 | Krikorian et al. |
| 2005/0084018 | A1 | 4/2005 | LeComte |
| 2005/0262257 | A1 | 11/2005 | Major et al. |
| 2008/0010653 | A1 | 1/2008 | Ollikainen et al. |
| 2008/0133767 | A1* | 6/2008 | Birrer ............... H04L 65/4076 709/231 |
| 2008/0256359 | A1* | 10/2008 | Kahn ................ H04H 60/14 713/170 |
| 2008/0256615 | A1* | 10/2008 | Schlacht ............. H04N 7/162 726/9 |
| 2009/0110059 | A1* | 4/2009 | Rzeszewski et al. ...... 375/240.2 |
| 2009/0125634 | A1* | 5/2009 | Virdi et al. ................. 709/231 |
| 2010/0005483 | A1* | 1/2010 | Rao ................ H04N 7/17318 725/25 |
| 2010/0011393 | A1 | 1/2010 | Lecomte et al. |
| 2010/0071076 | A1* | 3/2010 | Gangotri ............... G06F 21/10 726/32 |
| 2010/0138900 | A1* | 6/2010 | Peterka et al. .................... 726/4 |
| 2010/0169502 | A1* | 7/2010 | Knowlson ........... H04L 67/2847 709/231 |
| 2010/0329357 | A1* | 12/2010 | Minamoto ............... 375/240.25 |
| 2011/0055886 | A1* | 3/2011 | Bennett ................ H04L 63/18 725/116 |
| 2011/0320559 | A1 | 12/2011 | Foti |
| 2012/0210216 | A1 | 8/2012 | Hurst |
| 2012/0216236 | A1* | 8/2012 | Robinson ................ H04N 7/16 725/118 |
| 2012/0304233 | A1* | 11/2012 | Roberts et al. .................. 725/82 |
| 2012/0304243 | A1* | 11/2012 | Li .......................... H04N 7/152 725/146 |
| 2013/0191489 | A1* | 7/2013 | Swaminathan ..... H04L 65/4084 709/213 |
| 2013/0219449 | A1* | 8/2013 | Muvavarirwa et al. ...... 725/139 |
| 2013/0298154 | A1* | 11/2013 | Panigrahi ....................... 725/28 |
| 2014/0109144 | A1 | 4/2014 | Asnis et al. |
| 2014/0282771 | A1* | 9/2014 | Tumuluru et al. .............. 725/95 |

FOREIGN PATENT DOCUMENTS

| | | |
|---|---|---|
| EP | 2439892 A1 | 4/2012 |
| WO | 2008000894 A1 | 1/2008 |

OTHER PUBLICATIONS

European Patent Office International Searching Authority, International Search Report and Written Opinion dated Jul. 7, 2014 for International Application No. PCT/US2014/026061.
Major, Darren et al. Placeshifting of Adaptive Media Stream, U.S. Appl. No. 13/837,108, filed Mar. 15, 2013.
The International Bureau of WIPO, International Preliminary Report on Patentability in International Application No. PCT/US2014/026399 mailed Sep. 24, 2015.
The International Bureau of WIPO, International Preliminary Report on Patentability in International Application No. PCT/US2014/026061 mailed Sep. 24, 2015.
USPTO, Office Action in U.S. Appl. No. 13/837,108 dated Nov. 2, 2016.
Canadian Intellectual Property Office, Official Action in Canadian Patent Application No. 2,914,626 mailed Nov. 29, 2016.
USPTO, Notice of Allowance and Fee(s) Due in U.S. Appl. No. 13/837,108 dated May 10, 2017.

* cited by examiner

ASYMMETRIC CONTENT DELIVERY OF MEDIA CONTENT

PRIORITY CLAIM

This application claims priority to U.S. Provisional Application Ser. No. 61/791,044, which was filed on Mar. 15, 2013.

TECHNICAL FIELD

The present disclosure generally relates media streaming, and more particularly relates to systems, devices and methods involving remote viewing of streaming media content.

BACKGROUND

Streaming media is commonly used to deliver television programs, movies and other digital media content over the Internet and other networks. At present, a variety of streaming audio, video and/or other media content is available to consumers from any number of diverse sources. A large amount of video-on-demand (VOD) content, for example, is now available for network streaming from many different sources. Media streams are also used to deliver other types of media content including live and pre-recorded broadcast television, so-called "Internet (or IP) television", stored media content (e.g., content stored in a remote storage digital video recorder (RSDVR)), placeshifted media content and many others.

As customers watch more and more content that is streamed from an RSDVR or other remote source, various challenges can arise. In particular, streaming content directly to a remote device such as a mobile phone, tablet, portable computer or the like can create licensing or security concerns. While most content owners are comfortable in providing media streams directly to the customer's home or other premises, many are still reluctant to allow open streaming on the Internet or other networks. While various placeshifting techniques have somewhat addressed the security concerns of streaming to remote devices, technical issues nevertheless remain due to factors such as the limited upload speeds typically available from most conventional home-type connections. Simply stated, many home network connections lack the capacity to transmit a placeshifted media stream that has the quality and responsiveness now expected by many remote users.

It is therefore desirable to create systems, device and methods to effectively yet securely deliver streaming media content from an RSDVR or other network source to various types of remote media devices over the Internet or other networks. These and other desirable features and characteristics will become apparent from the subsequent detailed description and the appended claims, taken in conjunction with the accompanying drawings and this background section.

BRIEF SUMMARY

Various embodiments provide client or server systems, devices and/or methods to effectively yet securely deliver media streams to remote devices. Media delivery is adapted so that a portion of the media stream is delivered to the remote device via a customer's set top box or other home device to maintain the security and integrity of the streamed content. The remaining portion of the media stream is delivered directly to the remote device over a higher-bandwidth connection. The remote device then rejoins the portion of the stream received from the content source with the portion delivered via the home device so that the media content can be decoded for playback to the viewer. The portion of the media stream that passes through or originates with the home device could be a key portion of the media stream such that the media stream is not otherwise decodable by the remote device without the key portion.

More particularly, various embodiments provide a method executable by a remote media player device that communicates on a network and that is operable by a user. The method comprises the broad steps of receiving a selection of a media program available from a content source on the network that is to be played back for the user, wherein the selected media program is represented by a media stream that is viewable using the remote media player device; establishing a first connection over the network between the remote media player device and a home device that is associated with the user, wherein the home device is separate from the content source; establishing a second connection over the network between the remote media player device and the content source, wherein the second connection is separate from the first connection; receiving a first portion of the media stream via the first connection with the home device; simultaneously receiving a second portion of the media stream via the second connection with the content source; and reassembling the first and second portions of the media stream by the remote media player device for playback of the media stream to the user.

Other embodiments provide a remote media player device to play back a media stream for a user. The remote media player device suitably comprises an interface to a network and a processor. The processor is appropriately configured to execute software, firmware or other appropriate logic to carry out various functions, such as receive a selection of a media program available from a content source on the network that is to be played back for the user, wherein the selected media program is represented by the media stream; establishing a first connection via the interface, wherein the first connection is established between the remote media player device and a home device that is associated with the user, wherein the home device is separate from the content source; establishing a second connection via the interface that is separate from the first connection, wherein the second connection is established between the remote media player device and the content source; receiving a first portion of the media stream via the first connection with the home device; simultaneously receiving a second portion of the media stream via the second connection with the content source; and reassembling the first and second portions of the media stream for playback of the media stream to the user.

Still other embodiments provide a method executable by a content source to provide a media stream to a remote device over a network for playback to a user, the method comprising: receiving a request for the media stream from the remote device at the content source via the network; in response to the request, the content source establishing a first connection to a home device that is associated with the user and a second connection to the remote device; and providing a first portion of the media stream to the home device via the first connection and a second portion of the media stream to the remote device via the second connection, wherein the home device forwards the first portion of the media stream to the remote device so that the remote device is able to reassemble the media stream from the first and second portions for playback to the user.

Other embodiments could provide systems, devices, home devices, remote devices, content sources and/or the like that perform these or other functions. Various embodiments, aspects and features are described in detail below.

BRIEF DESCRIPTION OF THE DRAWING FIGURES

Figure 2:
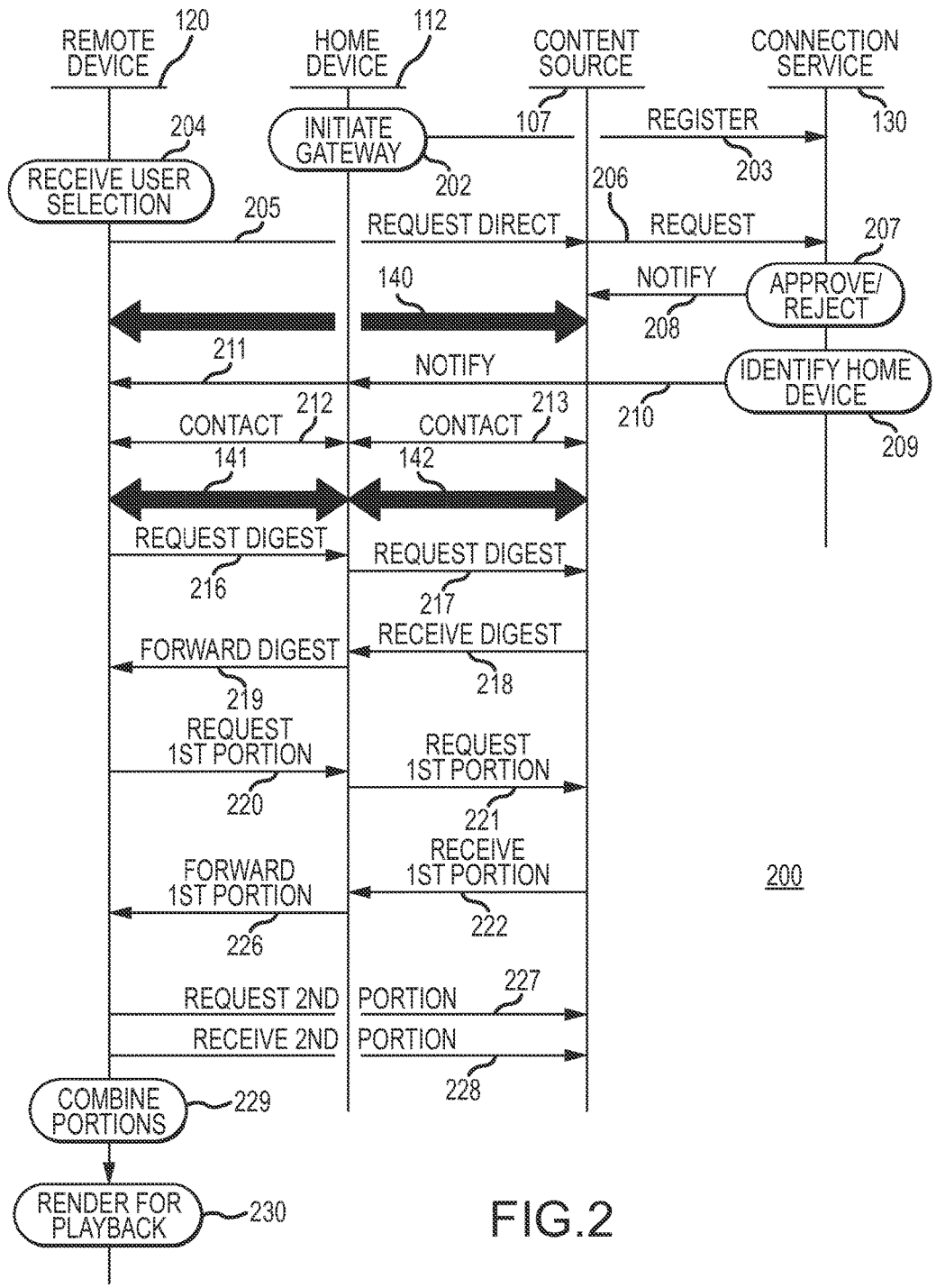

Exemplary embodiments will hereinafter be described in conjunction with the following drawing figures, wherein like numerals denote like elements, and FIG. 1 is a block diagram of an exemplary system for delivering a media stream from a content source to a remote device using asymmetric content delivery techniques; and FIG. 2 is a data flow diagram showing an example of a process for delivering a media stream to a remote device using asymmetric content delivery.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a portion of the media stream provided to a remote device is received from a set top box, television receiver or other home device that is associated with the user. The remaining portion of the media stream is transmitted directly from the content source to the remote device, thereby reducing the amount of bandwidth that is processed through the home network. This hybrid approach provides the security benefit of passing important parts of the media stream through a secure home device while avoiding the bottleneck that would otherwise occur if the entire stream were uploaded through the customer's home network connection. This approach also provides for different content and origination rules depending on potential business rules imposed upon content aggregators or end consumers. Through the use of asymmetric content delivery, then, security and efficiency can both be preserved even though the stream is being provided to a remote device.

Turning now to the drawing figures, FIG. 1 illustrates an exemplary system 100 to support media streaming from an RSDVR or other content source 107 to a phone, tablet or other remote device 120. As noted above, the majority of the content 145 in the media stream can be provided directly from the content source 107 to the remote device 120 via connection 140. The remaining content 144 is separately provided to the user's home device 112, and the home device 112 forwards the remaining content 144 to the remote device via a separate connection 141. Content portion 144 may be provided via a connection 142 over network 125, or via a completely separate data link, such as a cable television or direct broadcast satellite (DBS) link. In various embodiments, home device 112 may be able to extract content portion 144 from programming recorded to storage 117, from a live broadcast and/or from another source, as described more fully below.

In various embodiments, content portion 144 provided by home device 112 consumes less bandwidth on network 125 than content portion 145, meaning that the bulk of the media stream is transmitted directly to the remote device 120 without consuming resources in the user's home network 119 or home router 110. Content portion 144 may, however, contain "key" portions of the media stream that are important (if not essential) to playback by the remote device 120. Key portions could include, for example, the intraframes ("I-frames") of an MPEG elementary stream, the DC components of a discrete cosine transform applied to the media stream, or the like. Additionally, content portion 144 may include data packets providing keys or other data utilized to decrypt either or both of the content portions 144 and 145. Equivalently, content portion 144 may simply contain certain segments 106 of an adaptive media stream that are interspersed with segments 106 received as content portion 145. Content 144 and/or 145 could also be encrypted or otherwise secured to the home device 112 and/or remote device 120 as desired. While the content portion 144 provided by the home device 112 may be smaller in size than content portion 145, then, the system 100 can be designed such that it would be very difficult to decode the media content 104 without content 144.

The various components of system 100 may be deployed under the control of one or more different entities. Typically, the user will maintain control over a local area or similar network 119 at a home or other home-type premises (e.g., an office, campus, factory or other "home" location) where a set top box, television receiver or similar home device 112 is located. The user will typically also own or at least control operation of the remote device 120, as described more fully below. In some implementations, encoder 102, content source 107 and connection server 130 are jointly operated by a content distributor such as a cable television operator, a direct broadcast satellite (DBS) service provider, broadcast network, or the like. Such a distributor would typically support multiple users, each with their own home devices 110 and remote devices 120. Other embodiments could separate the encoding, distributing and operating functions between different parties. A television network or other content producer could provide already-encoded media streams, for example, that could be made available via a commercially-available content delivery network (CDN) or other server while a distributor or other party maintains control of the system 100 via connection server 130. In still other embodiments, important components 144 of programs that are partially or entirely recorded on a PVR or other storage 117 associated with home device 112 could be "placeshifted" to remote device 120, with the bulk of the placeshifted media stream supplied to the remote device 130 via connection 140. In such embodiments, program components 144 may have been delivered to home device 112 via a television link or other medium rather than via a connection 142 over network 125. Any number of alternate arrangements could be formulated.

Remote device 120 variously represents any sort of mobile phone, tablet PC, laptop or other PC, video game device, media player, or other consumer-type device that is operated by a user at a location on network 125 that is away from his or her home network 109. Remote devices 120 are able to obtain and playback media content, including media streams that originate with content source 107. Typically, remote devices 120 will include any conventional processors 121, memory 122 and input/output interfaces 123 for supporting interactions with the user and/or connections to network 125, as well as any other conventional resources commonly found in consumer-type computers and other electronic devices. Remote device 120 may provide a media player application 124, for example, that would typically reside in memory 122 and be executable by one or more processors 121. It is not necessary that all remote devices 120 be mobile devices; more stationary PCs, media players, video game players, televisions, television receivers and/or other components may be considered "remote devices" if they are located at physical or network locations that are distinct from the user's "home" premises. Indeed, some embodiments could use equivalent techniques to provide media streaming even within the user's home premises, such as to a home media player 118 or the like that resides on the user's home network 119.

Home device 112 is any sort of device or component that is located at the user's home premises and that is capable of processing media streams as described herein. Typically, home device 112 is a consumer-type device that includes a conventional processor 113, as well as memory 114 and input/output features 115 (e.g., user and network interfaces), in additional to any other hardware, software and/or firmware components that are commonly associated with conventional consumer electronics or computing devices. Various embodiments could implement home device 112 within a media player, set top box, television receiver, video game player, audio or video processor, television and/or any other consumer-type device. Home device 112 could also be implemented using a personal computer or the like that is located at the user's home premises. In various embodiments, the home device functionality described herein is incorporated into an otherwise-conventional set top box that is provided by a television content distributor. This allows the content distributor to retain substantial control over the hardware and software 116 used in distributing the media content, thereby preserving the security of system 100.

Home device 112 typically incorporates a software or firmware program 116 that resides in memory 114 and that is executable by processor 113 to perform the various functions described herein. In various embodiments, program 116 performs the various functions described herein relating to obtaining media content 144 from content source 107 and forwarding the obtained portion 144 to remote device 120.

In some implementations, home device 112 includes (or at least communicates with) a storage device 117 such as a hard disk drive, memory or the like. Storage device 117 may be used in implementing a personal video recorder (PVR), for example, that stores received programming for later viewing. Storage device 117 may also be used for caching media segments and/or other content that may not have been requested by the remote device 120, as desired. Further, some embodiments may allow home device 112 to extract components 144 from programming stored on device 117 and/or from a live television broadcast, thereby reducing or eliminating the need to provide such components 144 over network 125.

Home device 112 generally operates on a home-type network 119, such as a local area network (LAN) behind a router or similar device 110. Typically, router 110 provides a firewall that blocks undesired traffic from network 125 while allowing outgoing traffic from home network 119. For a content source 107 or remote device 120 to contact home device 112 via network 125, then, a gateway or the like is opened so that incoming messages can be provided to the home device 112, as described more fully below. Home network 119 may also include local media players or other home client devices 118 capable of receiving adaptive media streams, as desired.

The various connections 140-142 may be established and maintained in any manner to support the data transfers described herein. In some implementations, the various connections 140-142 may be conventional TCP or UDP connections that facilitate HTTP "get" and "put" instructions. Alternatively, connections 140-142 may be remote streaming transport protocol (RSTP) sessions, placeshifting sessions, and/or any other standard or proprietary connections as desired.

Media streams transmitted from content source 107 to remote device 120 may be formatted and structured in any manner, including any number of proprietary or non-proprietary formats. In various embodiments, media programs 104 are encoded into an adaptive streaming format that readily adapts to changing network conditions, processing resources, or other factors. Other embodiments may use non-adaptive streams, placeshifting streams, or any other media streaming techniques as desired.

The example illustrated in FIG. 1 shows an encoder 102 that creates an adaptive stream 103 that is transported as a series of separate segments 106 organized into multiple segment sets 105A-C. Encoder 102 may be, for example, a digital computer system that is programmed to create multiple sets 105A-C of segments 106 that each represent the same media program 104 in its entirety, but with different bit rates, frame rates, resolution and/or other levels of quality. Typically, each set 105A-C is made up of smaller segments 106 that each represent a small portion of the program content with a single data file. Sets 105A-C are typically encoded so that segments 106 of the different sets 105A-C are interchangeable with each other, often using a common timing index. This allows a client media player to mix and match segments 106 from different sets 105A-C to create a media stream that effectively adapts as network conditions or other conditions change. Several examples of adaptive streaming systems, devices and techniques are described in US Patent Publication No. 2008/0195743. Other embodiments could use different encoding structures or techniques, including non-adaptive techniques, as desired.

With continued reference to the example of FIG. 1, sets 105 of segments 106 are stored on a content source 107 for distribution on the Internet or another network 125. Content source 107 may be, for example, an RSDVR server, a video-on-demand (VOD) server, or any other source of streaming media as desired. Various embodiments may distribute the various segments 106 or other streams using a content delivery network (CDN) or the like. In some embodiments, content source 107 may be configured as a passive file server device, such as an HTTP server. In other embodiments, the content source 107 may be configured with the ability to enforce business rules and open connections with other devices on the network, such as to push content to media player application 124.

In conventional adaptive streaming, a media player application 124 executing on one or more client devices 120 contains intelligent logic to select appropriate segments 106 as needed to obtain and playback the media program 104. As noted above, segments 106 may be interchangeable between sets 105A-C so that higher quality segments 106 may be seamlessly intermixed with lower quality segments 106 to reflect changing network or other conditions in delivery over network 125. In some implementations, the media player application 124 initially obtains a digest or other description of the available segments 106 so that the player itself can select and request the particular segments 106 that are desired. Since the segments 106 are typically stored as separate files, segment requests may take the form of conventional hypertext transport protocol (HTTP) constructs (e.g., HTTP "get" instructions) or the like. Such constructs are readily routable on network 125 and can be served by conventional CDN or other web-type servers 110, thereby providing a convenient mechanism for distributing adaptive media streams to a variety of different client devices on network 125. However, in other embodiments, a media file may not be segmented prior to distribution, and instead, a media player application 124 may be configured to request particular memory locations or other resources from a source device. Other embodiments may be formulated as well.

In various embodiments, a connection server 130 is provided to locate and contact the user's home device 112 on network 125. To that end, connection server 130 is a computerized service that facilitates data connections 141 between remote devices 120 and home devices 112 operated by various users. In many implementations, connection server 130 executes on a conventional server or other digital computer that includes a processor 131, memory 132, input/output interfaces 133 (e.g., an interface to network 125), and/or the like. Equivalent embodiments could implement some or all of connection server 130 using cloud-based computing resources or the like.

Connection server 130 typically operates in conjunction with a database 132 that associates customers or other users with their particular home devices 112, and that maintains a current network address that can be used to contact the home device 112 for placeshifting connections 141. As users of remote devices 120 identify themselves to server 130, their home devices 112 can be located and contacted, as described more fully below. Database 132 may additionally or alternately contain other information, such as information about the type, location or address of remote device 120, as desired.

In operation, then, home device 112 initially establishes a gateway or other access through firewall no via network 125. Typically, home device 112 registers with connection service 130 to provide an address that can be used to establish subsequent media streaming sessions. When a remote device 120 attempts to obtain a placeshifted stream, connection service 130 is able to provide the remote device 120 and/or the content source 107 with information to establish a session 141 with the user's home device 112. In the embodiment of FIG. 1, home device 112 also communicates with the remote device 120 and with the content source 107 to obtain segments 106 of the adaptive stream 142 on behalf of remote device 120. Again, other embodiments may use non-adaptive streaming techniques or different adaptive techniques from those described herein.

FIG. 2 provides additional detail about an exemplary process 200 to deliver a media stream from content source 107 to the remote device 120 using home device 112 as an intermediary for a portion 144 of the media content. FIG. 2 illustrates several examples of functions that may be performed by the various devices in system 100, as well as examples of messages that may be passed between devices as desired. The exemplary process 200 illustrated in FIG. 2 may be supplemented or modified to create any number of equivalent implementations.

In the embodiment illustrated in FIG. 2, the home device 112 initially opens a gateway in firewall no so that connections can be received from network 125 (function 202). In some implementations, the gateway could be implemented as a universal plug-n-play (uPnP) gateway in accordance with the Internet Gateway Device (IGD) protocol or the like. Such a gateway automatically configures port forwarding through router 110 to allow incoming connections to home network 119. In other embodiments, home device 112 could initially establish a persistent connection (e.g. a TCP connection) with connection server 130 or another messaging service that is maintained over time so that the server 130 can send instructions to the home device as desired. Several examples of persistent connection techniques are described in US Patent Publication No. 2011/0119325, although other techniques could be equivalently used. In various embodiments, the home device 112 is configured in firmware or the like to establish the gateway on startup so that access is available whenever home device 112 is active. Typically, home device 112 registers an address and port number of the gateway with connection service 130 (function 203) to facilitate subsequent connections 141 and/or 142, as desired.

Typically, a user of the remote device 120 selects programming for viewing in any manner (function 204). In some implementations, content selections are presented in a web browser or other application 124 executing on remote device 120. The viewer simply selects the desired program 104 available from content source 107 using conventional user interface features of the remote device 120. As noted above, the selected programming could include RSDVR or video on demand content such as live or prerecorded television programs, movies, or any other media content as desired.

In the example of FIG. 2, remote device 120 initially attempts to obtain an adaptive stream 140 directly from content source 107 (function 205), and content source 107 forwards this request to the connection service 130 (function 206) to approve or reject the connection. Alternatively, the remote device 120 could directly contact connection service 130 with request 205. Service 130 approves or rejects the connection request (function 207) and notifies content source 107 as appropriate (function 208) so that the direct connections 140 between the content source 107 and the remote device 120 can be established.

In some implementations, connection server 130 additionally authenticates and/or authorizes the streaming media session as desired (function 207). Connection server 130 could, for example, authorize the user and/or the remote device 120 with a userid/password combination, a biometric factor, a digital code stored on or otherwise associated with the user's remote device 120, and/or any other credential. Connection server 130 could further authorize particular transactions between remote devices 120 and home devices 112 based upon information stored in a subscriber or customer database 132, or the like. Some implementations may further process billing or other accounting functions using connection service 130, as desired. Billing may be useful, for example, in a "pay per connection" system, or the like. Any number of session authentication or authorization techniques could be applied by connection server 130, as desired.

Connection service 130 suitably identifies the home device 112 that is associated with the user requesting the connection (function 209), and responds with a current address for the identified device 112 on network 125 (functions 210, 211). The current address may be, for example, an internet protocol (IP) address and port number that is associated with the gateway previously established in function 202. In an embodiment that uses pre-existing connections to home devices 112 instead of gateways, connection service 130 could use a previously-established persistent connection to direct the home device 112 to contact the remote device 120, thereby allowing the streaming session to be established as an outgoing connection from the home device 112 to the remote device 120 and/or content source 107, as desired.

The various connections 140, 141, 142 shown in system 100 may be initiated by content source 107, home device 112, remote device 120 and/or connection server 130 in any manner (functions 212, 213). In one example, the home device 112 receives instructions to initiate outgoing connections 141 and 142 to remote device 120 and content source 107, respectively. Other embodiments could initiate the various connections 140-142 from the remote device 120 or content source 107 using address information provided by connection service 130. In the embodiment shown in FIG. 2, the remote device 120 uses the address information 210 received from the connection server 130 to contact one or more home devices 112 (function 212) and thereby establish streaming connection 141. Other connection techniques could be applied in any number of equivalent embodiments.

The streaming session itself may be established using any conventional media streaming techniques, with the home device 112 acting as the "server" and the remote device 120 acting as the "client" to the media stream. In embodiments that make use of adaptive media streaming, the media player application 124 at remote device 120 suitably requests certain segments 106 of an adaptive stream from home device 112, but otherwise operates as if it were requesting segments 106 directly from the content source 107. The home device 112, conversely, could act as a media streaming client to obtain the requested content from the content source 107 while simultaneously serving the received segments 106 to the remote device 120. This allows for convenient streaming of the content portion 144 from home device 112 to remote device 120 in a relatively seamless manner, while retaining the efficiencies of adaptive streaming.

In the adaptive streaming implementation shown in FIG. 2, the media player 124 at remote device 120 initially requests a digest or other summary of the various segments 106 that are available for the selected program (function 216). The remote device 120 typically also identifies the selected program 104 to the home device 112 and/or content source 107 to allow the appropriate data to be located and obtained from source 107, as desired. This allows the home device 112 to request the digest for the appropriate program 104 from content source 107 (function 217), and to receive the requested digest from the content source (function 218). The received digest is passed through the home device 112 and forwarded on to the remote device 120 (function 219). Other embodiments could obtain the digest directly from the content source 107, although providing important information such as the digest via the home device 112 can enhance the security of the system. Typically, the digest will contain information identifying the various quality sets 105A-C that may be available for the particular program 104, along with URL or other naming conventions identifying the various segments 106 of each set 105A-C. This allows media player application 124 at remote device 120 to request appropriate segments 106 of the various sets 105A-C from content source 107 and/or home device 112 using conventional adaptive streaming techniques. Again, equivalent embodiments could use non-adaptive or other video streaming mechanisms, as desired.

As noted above, remote device 120 receives a portion 144 of the media stream via the home device 112, and another portion 145 of the media stream directly from the content source 107. The particular portions 144, 145 sent via the two separate paths may be assigned in any manner. In the example of FIG. 2, certain segments 106 of media portion 144 are requested via connection 141 with home device 112 (function 220). These requests are received at application 116 of the home device 112, which suitably forwards the request to content source 107 (function 221) to obtain the requested segment 106 selected by the remote device 120. When the requested segment 106 is received from the content source 107 (function 222), the received segment 106 can be passed through home device 112 and forwarded to the remote device 120 as desired (function 226). At the same time, additional segments 106 of media portion 145 can be requested directly from the content source 107 (function 227), and these segments 105 are delivered via connection 140 (function 228). As noted above, the requesting and delivery of segments 106 between remote device 120, home device 112 and content source 107 may be implemented using conventional HTTP "get" and "put" constructs, or similar constructs that are readily routed on network 125.

Equivalently, home device 112 could provide portion 144 based upon content received from a source other than connection 142. Home device 112 could extract portion 144, for example, from content stored at home device 112 (e.g., content stored in a PVR or other storage 117), from content received via a DBS, cable or other television broadcast, or from any other source. In such embodiments, home device 112 receives an indication from connection service 130, content source 107, remote device 120 and/or any other source that identifies the contents 144 to be provided. The relevant portion 144 is suitably obtained, extracted and provided to remote device 120 via connection 141 or the like. Asymmetric content delivery could greatly improve the efficiency of so-called "placeshifting" applications as relevant portions 144 of programming stored on a DVR or other storage 117 are provided from home device 120, but the bulk of the content is instead obtained directly from a separate content source 107 having a more efficient connection 140 over network 125.

Remote device 120 re-combines the separate potions 144, 145 of the media stream (function 229) and renders the combined stream as an output to the user for playback (function 230). If the remote device 120 has its own display (e.g., a phone or tablet computer), then function 230 may involve displaying the content represented by the media stream on the internal display. Other remote devices (e.g., video game players, media players and the like) could simply decode the combined stream and provide the decoded video and/or audio to an external display (e.g., a television or monitor) for presentation to the viewer. In some embodiments, the remote device 120 stores the content in a personal video recorder (PVR) or other storage on device 120 for later playback rather than immediate viewing by a user. Remote device 120 could download and store a television program or movie, for example, for offline viewing on an airplane or at a later time when online access to network 125 may not be available. Again, other features and applications may be provided for online or offline viewing of file-based or streaming content.

To continue the example of FIG. 2, the particular segments 106 of the media stream making up the portion 144 delivered via home device 112 may be selected in any manner. In various embodiments, a certain portion of the segments (e.g., every Nth segment) is obtained via connections 141, 142 instead of connection 140. Other embodiments could specify certain time indexes (e.g., certain parts of the program) that are deliverable only via the home device 112. Any number of other rules of segment delivery could be formulated and enforced by content source 107 or other components of system 100, as desired. These rules are provided to content source 107, home device 112 and/or remote device 120 as appropriate.

In one example illustrated in FIG. 2, the home device 112 acts as an intermediary that passes segment requests and received segments between remote device 120 and content source 107. It is not necessary that the home device 112 perform any additional processing on the received requests or media segments other than simply forwarding them along to their ultimate destinations. In various embodiments, however, home device 112 could perform additional processing related to segments 106 as desired. Home device 112 could perform any sort of encrypting, transcoding, short or long term storage and/or other modification of the received segments 106, for example, if such features are desired.

The segment passthrough technique described above further preserves the benefits of adaptive streaming while incorporating the home device 112 into the delivery path 141, 142, since the remote device 120 is free to adapt its segment requests in the event of changing network conditions or the like. It may also be relatively easy to implement, since the particular segments 106 may not need to be re-encoded or otherwise modified.

Other embodiments may separate the portions 144, 145 of the media stream in other ways. Some implementations could extract a portion 144 of the data needed to decode the content in portion 145. If the media program 104 is encoded as a conventional MPEG elementary stream, for example, then key portions of the stream could be extracted and transported in portion 144 while the bulk of the data in the stream is transported in portion 145. Some or all of the MPEG I-frames, for example, could be transmitted via portion 144 while the remaining I-frames and the bulk of the P-frames, B-frames and the like could be transmitted directly to the remote device 1120 as portion 145. Alternately, a portion of the frames (e.g., the DC components of some or all of the I-frames) could be sent as portion 144, as described below. Other embodiments may discriminate between data 144 transmitted via home device 120 and data 145 transmitted directly to remote device 112 in any other manner. Re-assembly function 229, then, would involve re-assembling the various frames based upon a presentation time stamp (PTS) or other index, as appropriate. Still further embodiments could provide a portion of the I-frames (e.g., every alternate, or every Nth) frame via the home device 112 to further reduce the bandwidth of portion 144.

Other embodiments could use portion 144 to transport information used in decompressing or decoding data contained in portion 145. If the media stream is compressed with a discrete cosine transform (DST), for example, the DC data (representing the average coefficient for a block of data) of one or more frames could be transported via portion 144 while the AC data for the same frames (representing particular deviations from the average for each data value) could be transported via portion 145. This would effectively prevent any unauthorized decoding of portion 145 unless portion 144 was also available. As noted above, data portion 144 (and/or data portion 145) could be further encrypted for added security, as desired.

FIG. 2 therefore provides an exemplary process 200 to provide a media stream to a remote device using asymmetric data transmission across two separate channels. Many of the functions shown in FIG. 2 may be carried out using programmable software code executed by a computer system, such as home device 112, remote device 120, content source 107 and/or connection server 130 as appropriate. The software code used to implement the various functions may be stored in memory, disk storage or other non-transitory storage available to the appropriate computer system, and may be executed by any conventional microprocessor, microcontroller or other programmable circuitry. Equivalent embodiments may supplement, modify and/or differently arrange the various functions shown in FIG. 2 in any manner.

The foregoing discussion therefore considers various systems, devices and methods to deliver a media stream from a home device to a remote device. Various benefits may be realized from the different embodiments described herein. In addition to improved security, various embodiments could use the techniques herein to verify that a home device 112 has a legal copy of a program being distributed to the remote device 120, thereby leading to improved copyright protection. Such protection may also be beneficial in complying with legal or contractual obligations limiting distribution of program content on network 125, or for any other purpose.

The general concepts set forth herein may be adapted to any number of equivalent embodiments. Although the discussion herein frequently considers network 125 to be the Internet or a similar network, for example, equivalent concepts could be applied to other public/private/hybrid networks, telephone networks, and/or the like. Further, although adaptive streaming techniques are frequently used as examples herein, it is not necessary to these in all implementations. Many other adaptive or non-adaptive streaming techniques could be equivalently used. Many other enhancements, modifications and other changes could be made in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations, nor is it intended to represent a model that must necessarily be duplicated. While several examples have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a remote media player device that communicates on a network and that is operable by a user, the method comprising:

receiving a selection of a media program available from a content source on the network that is to be played back for the user by the remote media player device, wherein the selected media program is represented by a media stream originating from the content source that is viewable using the remote media player device;

establishing a first connection via the network between the remote media player device and a home device that is associated with the user and that is trusted by the content source, wherein the home device is separate from the content source;

establishing a second connection via the network between the remote media player device and the content source, wherein the second connection is separate from the first connection but uses the same network;

transmitting, by the remote media player device, a first request via the first connection to the home device that is trusted by the content source that identifies a first portion of the media stream representing the selected media program, wherein the home device responds to the first request received from the remote media player device by obtaining the identified first portion of the selected media program from the content source on behalf of the remote media player device;

transmitting, by the remote media player device, a second request to the content source via the second connection, wherein the second request identifies a second portion of the media stream representing the selected media program that is different from the first portion;

receiving, by the remote media player device, the first portion of the media stream, wherein the first portion is obtained from the content source on behalf of the remote media player by the home device that is trusted by the content source and is delivered from the home device to the remote media player device via the first connection;

receiving, by the remote media player, the second portion of the media stream directly from the content source via the second connection; and reassembling, by the remote media player device, the first and second portions of the media stream representing the selected media stream for playback of the selected media stream to the user so that the selected media stream played back by the remote media player device is constructed from both the first portion received via the home device that is trusted by the content source and the second portion that is received directly from the content source.

2. The method of claim 1 further comprising the remote media player requesting a digest that describes the portions of the media stream representing the media program, wherein the digest is requested and received from the home device via the first connection, wherein the home device responsively obtains the requested digest from the content source on behalf of the remote media player, and wherein the transmitting of the first and second requests occurs after the remote media player receives the digest obtained by the home device on behalf of the media player.

3. The method of claim 1 wherein the first portion of the media stream received from the home device comprises a key portion of the media stream such that the media stream is not decodable by the remote media player device without the first portion of the media stream.

4. The method of claim 3 wherein the media stream comprises an MPEG elementary stream, and wherein the key portion comprises the intraframes of the MPEG elementary stream.

5. The method of claim 4 wherein the frames other than the intraframes of the MPEG elementary stream are simultaneously provided to the remote media player device via the second connection to the content source.

6. The method of claim 1 wherein the media stream is encoded using a discrete cosine transform to produce DC components and AC components, and wherein the DC components are provided to the remote media player device via the first connection to the home device and the AC components are simultaneously provided to the remote media player device via the second connection to the content source.

7. The method of claim 1 wherein the media stream is an adaptive media stream represented by a series of segments, and wherein a first subset of the series of segments is obtained via the first connection to the home device, and wherein a second subset of the series of segments is simultaneously obtained via the second connection to the content source.

8. The method of claim 7 further comprising the remote media player requesting a digest that describes the segments of the adaptive media stream, wherein the digest is requested and received from the home device via the first connection, wherein the home device responsively obtains the requested digest from the content source on behalf of the remote media player, and wherein the first and second portions of the media stream obtained in response to the first and second requests are segments described in the digest.

9. The method of claim 7 further comprising the remote media player placing requests for the first subset of segments to the home device via the first connection, and wherein the home device obtains the first subset of segments from the content source in response to the requests from the remote media player, and wherein the home device forwards the obtained segments to the remote media player via the first connection.

10. A remote media player device comprising:
an interface to a network; and
a processor that:
receives a selection of a media program available from a content source on the network that is to be played back for a user of the remote media player, wherein the selected media program is represented by a media stream originating from the content source that is viewable using the remote media player device;

establishes a first connection via the interface, wherein the first connection is established via the network between the remote media player device and a home device that is associated with the user and that is trusted by the content source, wherein the home device is separate from the content source;

establishes a second connection via the interface that is separate from the first connection, wherein the second connection is established between the remote media player device and the content source via the same network as the first connection;

transmits a first request via the first connection to the home device that is trusted by the content source that identifies a first portion of the media stream representing the selected media program, wherein the home device responds to the first request received from the remote media player device by obtaining the identified first portion of the selected media program from the content source on behalf of the remote media player device;

transmits a second request to the content source via the second connection, wherein the second request identifies a second portion of the media stream representing the selected media program that is different from the first portion;

receives the requested first portion of the media stream from the content source via the first connection, wherein the first portion is obtained from the content source on behalf of the remote media player by the home device that is trusted by the content source and is delivered from the home device to the remote media player via the first connection;

receives the second portion of the media stream directly from the content source via the second connection; and reassembles the first and second portions of the media stream for playback of the media stream to the user so that the media stream played back by the remote media player device is constructed from both the first portion received from the content source via the home device that is trusted by the content source and the second portion received directly from the content source.

11. The remote media player device of claim 10 wherein the remote device is a mobile computing device carried by the user, and wherein the home device is a television receiver located at the user's home premises that receives broadcast television content for the user.

12. The remote media player device of claim 11 wherein the content source is a remote storage digital video recorder (RSDVR) that is controllable by the user but that is operated by a content distributor.

13. A method executable by a content source to provide a media stream to a remote device over a network for playback to a user, the method comprising:
receiving a request for the media stream from the remote device at the content source via the network;
in response to the request, the content source establishing a first connection via the network with a home device that is associated with the user and that is trusted by the content source, and also establishing a second connection via the network directly with the remote device;
in response to subsequent requests received via the first and second connections, the content source simultaneously providing a first portion of the media stream representing the requested media program to the home device that is trusted by the content source via the first connection and a second portion of the media stream representing the requested media program directly to the remote device via the second connection, wherein the home device forwards the first portion of the media stream to the remote device so that the remote device is able to reassemble the media stream from the first and second portions for playback to the user so that the media stream played back by the remote media player device is constructed from both the first portion received from the content source via the home device that is trusted by the content source and the second portion received directly from the content source.

14. The method of claim 13 wherein the content source is a remote service digital video recorder (RSDVR) that is operated by the user but maintained by a content service provider, and wherein the home device is a television receiver that receives broadcast television content provided by the content service provider.

15. The method of claim 13 further comprising:
receiving, via the first connection, a request forwarded by the home device on behalf of the remote media player for a digest that describes the portions of the media stream representing the media program; and
responsively providing to the digest to the home device via the first connection, wherein the home device forwards the requested digest to the remote media player to thereby allow the remote media player to identify and request the first and second portions of the media stream from the content source.

16. The method of claim 13 wherein the first portion of the media stream provided to the home device comprises a key portion of the media stream such that the media stream is not decodable by the remote media player device without the first portion of the media stream.

17. The method of claim 16 wherein the media stream comprises an MPEG elementary stream, and wherein the key portion comprises the intraframes of the MPEG elementary stream and wherein the frames other than the intraframes of the MPEG elementary stream are simultaneously provided to the remote media player device via the second connection to the content source.

18. The method of claim 13 wherein the media stream is encoded using a discrete cosine transform to produce DC components and AC components, and wherein the DC components are provided via the first connection to the home device and the AC components are simultaneously provided to the remote media player device via the second connection.

19. The method of claim 13 wherein the media stream is an adaptive media stream represented by a series of segments, and wherein a first subset of the series of segments is obtained via the first connection to the home device, and wherein a second subset of the series of segments is simultaneously obtained via the second connection to the content source, and wherein the first subset of segments is smaller than the second subset of segments.

20. The method of claim 19 further comprising the content source:
receiving a request for a digest that describes the segments of the adaptive media stream from the remote player device via the first connection to the home device; and
providing digest to the home device via the first connection to thereby allow the home device to forward the digest on behalf of the remote media player.

* * * * *